United States Patent
Nishikawa

[11] Patent Number: 5,991,173
[45] Date of Patent: Nov. 23, 1999

[54] CONTROL DEVICE FOR SELF-EXCITING CURRENT SOURCE POWER CONVERTER

[75] Inventor: Hiroyuki Nishikawa, Tokyo, Japan

[73] Assignee: Kabushiki Kaisha Toshiba, Kawasaki, Japan

[21] Appl. No.: 09/182,515

[22] Filed: Oct. 30, 1998

[30] Foreign Application Priority Data

Oct. 30, 1997 [JP] Japan ................................ P09-298742

[51] Int. Cl.⁶ ..................................................... H02M 5/45
[52] U.S. Cl. ................................................. 363/37; 363/65
[58] Field of Search ................................. 363/34, 35, 37, 363/65, 67, 71; 323/205, 207

[56] References Cited

U.S. PATENT DOCUMENTS

| | | | |
|---|---|---|---|
| 4,903,184 | 2/1990 | Hirose | 363/37 |
| 5,535,113 | 7/1996 | Konishi | 363/35 |
| 5,663,627 | 9/1997 | Ogawa | 363/37 |
| 5,666,275 | 9/1997 | Inokuchi et al. | 363/25 |

FOREIGN PATENT DOCUMENTS 9-93819  4/1997  Japan .

Primary Examiner—Matthew Nguyen
Attorney, Agent, or Firm—Foley & Lardner

[57] ABSTRACT

A control device for a self-exciting current source electric power converter comprising a plurality of the self-turn-off devices connected in a bridge, and n-sets (n=a multiple of 2) of the electric source electric power converters, which convert AC into DC, or, convert DC into AC, wherein said converters are divided into two groups, an electric power regulating circuit, which controls the AC current of each converter, is provided for each group; an active current command value and the reactive electric power command value of all the electric power converters are inputted into the input side of the electric power regulating circuit respectively; at the same time, a positive arbitrary reactive power shift value (+Q) is added to one of the reactive electric power command values; a negative arbitrary reactive power shift value (−Q) is outputted to the other reactive electric power command values; and the both reactive power shift values are offset each other.

4 Claims, 15 Drawing Sheets

FIG. 5A  OUTPUT CURRENT OF A-GROUP 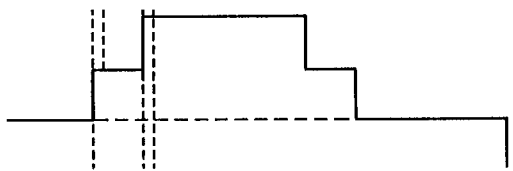
FIG. 5B  OUTPUT CURRENT OF B-GROUP 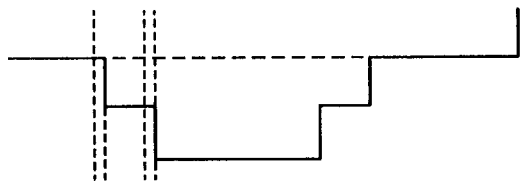
FIG. 5C  TOTAL CURRENT 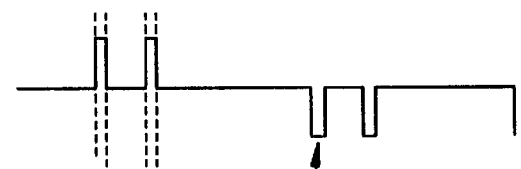
PULSES SHORTER THAN THE MINIMUM ON-TIME MAY BE OUTPUTTED
FIG. 5D
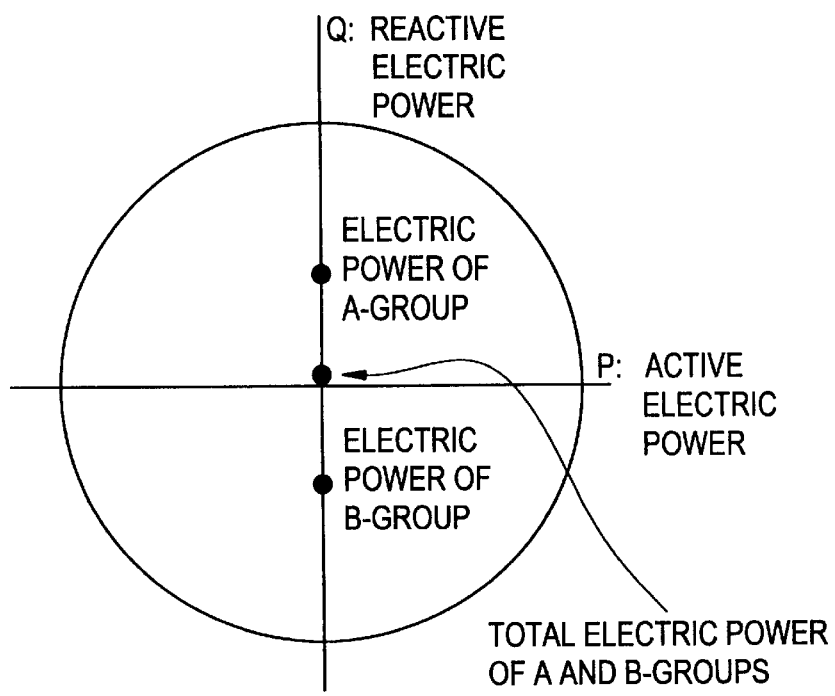

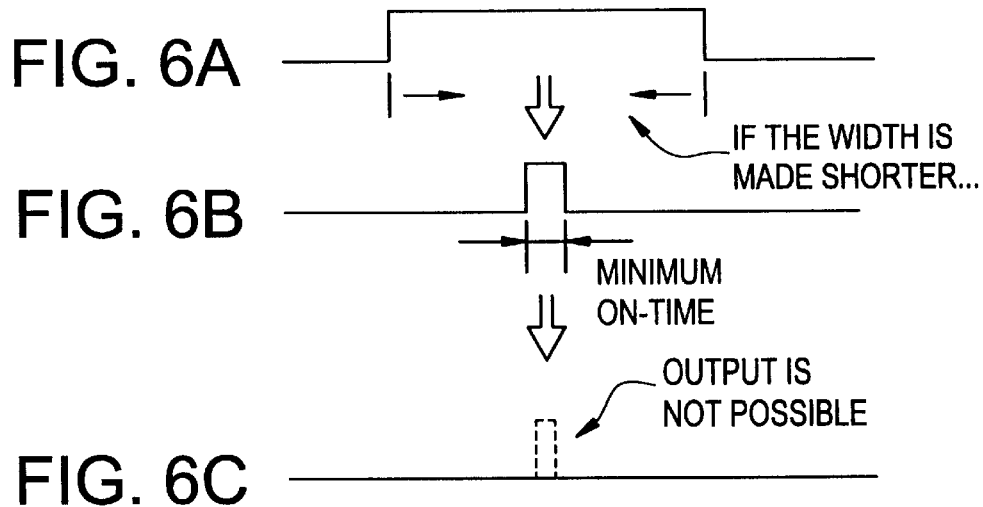
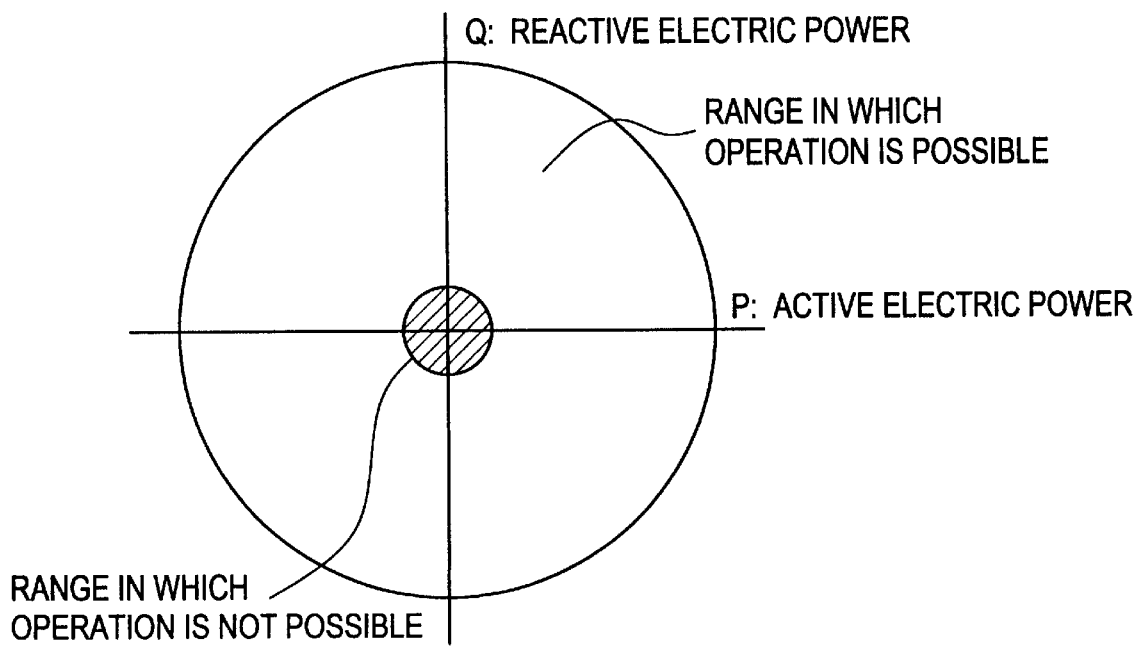

(NO CORRECTION)
OUTPUT CURRENT
OF THE INVERTER
(DC CURRENT LARGE)

(CORRECTION)
OUTPUT CURRENT
OF THE INVERTER
(DC CURRENT SMALL)

OUTPUT CURRENT OF INVERTERS AT THE TIME
OF OUTPUT OF LARGE ELECTRIC POWER

THE CURRENT FOR ONE
STEP IS DC CURRENT
DIVIDED BY THE MULTIPLE
NUMBER OF THE CONVERTERS

STAIRS FORM WITH THE STEPS,
WHICH NUMBER IF EQUAL TO
THE MULTIPLE NUMBER

OUTPUT CURRENT OF INVERTERS AT THE TIME
OF OUTPUT OF SMALL ELECTRIC POWER

HARMONICS
INCREASING

CONTROL DEVICE FOR SELF-EXCITING CURRENT SOURCE POWER CONVERTER

BACKGROUND OF THE PRESENT INVENTION

1. Field of the Present Invention

The present invention relates to a control device for self-exciting current source power converter.

2. Description of the Related Art

FIG. 1 is the drawing showing the constitution of main current of self-exciting current source power converter of the prior art.

In FIG. 1 the reference 101 indicates an alternating current load and references 102–104 indicate capacitors. References 105–108 indicate unit converters (hereinafter mentioned simply as converters), which are connected to AC load by unifying the respective AC terminals commonly to perform a parallel operation.

Also the capacitors 102–104 are used for absorbing the switching surge of the converters 105–108. The devices 109–132 are the self-turn-off devices forming the converters 105–108. Hereinafter, the cases, in which gate turn-off thyristors (hereinafter called GTO) are used as self-turn-off devices, are explained.

References 133–140 indicate the DC reactors which make DC smooth. References 141–144 indicate the DC electric sources. Each of the electric sources 141–144 is provided with a function to regulate the DC current, and the respective currents are equally regulated.

FIG. 2 shows the block diagram of the regulating circuit of the prior art for regulating the power converter of FIG. 1. Referring to FIG. 2, reference 149 indicates a circuit generating the current command value for the converters 105–108, reference 150 indicates a triangular wave generator, reference 152 indicates a comparator, and reference 153 indicates a logical circuit generating AC output commands for the converters 105–108.

FIG. 3 shows wave-diagrams, when the power converters of FIG. 1 is regulated by the regulating circuit of prior art shown in FIG. 2. Hereinafter the power converter of prior art is explained by referring to FIG. 1 and FIG. 2. The circuit generating electric current command value 149 generates a amplitude command value (1) and a phase angle command value. The amplitude command value (1) is given to the comparator 152.

The phase angle command values are given to both the phase angle detecting circuit 150 and the triangular wave generator 151. The signals (2)–(5) are the output signals forming triangular waves from the triangular wave generator 151, which period corresponds to 60° of the phase angle command values. Also, each of the triangular waves (3)–(5) delays by 15° each other compared to the triangular wave (2). The comparator 152 compares the amplitude command value (1) with the triangular waves (2)–(5), and the range, in which the amplitude command value is larger than the triangular waves, is regarded as output command. The output command is given to the logical circuit 153, and its phase identification determined by the output of the phase detecting circuit 150 and the AC output command for the converter is generated.

In other words, (6) is the U-phase output command of the converter 105 and (7) is the X-phase output command for the converter 105, (8) is the U-phase output command for the converter 106, (9) is the X-phase output command for the converter 106, (10) is the U-phase output command for the converter 107, (11) is the X-phase output command for the converter 107, (12) is the U-phase output command of the converter 108, and (13) is the X-phase output command for the converter 104.

By ON-OFF controlling the GTO of the converters 105–108 according to the output commands mentioned in the above, the current of the wave-form shown in (14) is obtained as U-phase output current. The same regulation as in the above is performed also for the V-phase and W-phase by delaying the respective phases by 120° each.

As described in the above, when the operation is performed by delaying the phase of the current of the GTO by 15° each by connecting the AC terminals of the converters 105–108 in parallel, the wave form of the composite wave of the waves from the respective converters becomes trapezoid wave containing the high frequency harmonic waves of the lower orders such as 5th and 7th order.

Also, in case of the self-exciting current source power converters in FIG. 1, as the electricity may be commutated in an arbitrary phase, the active electric power and the reactive electric power may be controlled independently, however, in case of the self-turn-off devices such as GTO, a minimum ON-time (or minimum OFF-time, for example 200 $\mu$s) has to be held as shown at (a), (b) and (c) of FIG. 6. Therefore, a pulse which is shorter than the minimum holding time maynot be outputted, and the power maynot be outputted in the inoperable range (d), i.e., in the range of 0 PU (Zero-par-unit).

SUMMARY OF THE PRESENT INVENTION

Accordingly, an object of the present invention is to provide a novel control device for self-exciting current power converters, wherein any high frequency output current does not increase even at the time of small power output, the power may be outputted also in the range of 0 PU and the switching loss may be reduced at the normal operation.

In order to achieve the above-mentioned object, according to the present invention, a control device for self-exciting current power converters, comprising a plurality of self-turn-off devices are connected each other in a bridge and n-sets (n=a multiple of 2) of current source power converters, by which AC is converted into DC or, DC is converted into AC, are provided, has been developed, wherein the power converters are divided into two groups; each group of the converters is provided with a power controlling circuit, which control the AC power in the converters; an active electric power command value and the reactive electric power command value of the total converters are fed to the input side of the respective power control circuits respectively; and arbitrary positive reactive power shift value (+Q) is added to one of the said reactive power command values and, an arbitrary negative reactive power shift value (−Q) is outputted to the other one of the reactive power command values and the said both reactive power shift values are offset each other.

According to the present invention, the power may be reduced to zero by outputting a reactive power shift value (+Q) in A group, by outputting a reactive shift value (−Q) in B-group and by offsetting the both values each other. In this case, as the power converters are operated at a high control value, it is not necessary to provide any condition such as holding of pulse at a minimum ON-time.

Furthermore, in order to achieve the above-mentioned object, according to the present invention, a control device for self-exciting current power converters, comprising a plurality of self-turn-off devices connected in a bridge and n-sets (n=a multiple of 2) of current source power converters, by which AC is converted into DC or, DC is converted into AC, has been developed, wherein the power converters are divided into two groups; the total DC current value of the respective power converters is detected, one half of the total DC current value is assumed as DC current command value; the before-mentioned DC current command value is compared with the group DC current value; a correction value is computed by proportionally integrating the deviation; the correction value is subtracted form the active power command value and also the correction value is added to the before-mentioned active power command value; the gate-signals for the respective power converters groups are obtained by performing the pulse width control basing upon the reduced value or the added value.

According to the present invention, a correction value is computed basing upon the total DC current value and the DC current value on one of the groups of power converters; DC current between one of the converter groups and the other one of the power converters may be equalized by adding the correction value to the current command of one group of the power converters and by subtracting the correction value from the current value of the other group of the power converters.

Meantime, further in order to achieve the object, according to the present invention, a control device for self-exciting current power converters, comprising a plurality of self-turn-off devices connected in a bridge, and n-sets (n=a multiple of 2) of current source power converters, by which AC is converted into DC or, DC is converted into AC, has been developed, wherein the power converters are divided into two groups; a multiple space vector control is performed by switching the positive switching device and the negative switching device alternately by a specific degree for each of the power converter group, and wherein the total DC current value of the respective power converters is detected; one half of the total DC current value is assumed as DC current command value; the positive current value and the negative current value of one group of the power converters are detected respectively; the before-mentioned DC current command value is compared with the said positive DC current value of the group; and also the before-mentioned DC current command value is compared with the negative DC current value of the group; a positive correction value and a negative correction value are computed by proportionally integrating the respective deviations; the before-mentioned positive correction value is inputted into the circuit which performs the before-mentioned multiple space vector control at the time of action of the positive switching device; the before-mentioned negative current correction value is inputted into the circuit which performs the multiple space vector control at the time of action of the negative switching device.

According to the present invention, as the switching between the positive current and negative current is performed alternately by 60 degrees each in a multiple space vector control circuit, the positive DC current and the negative DC current of the groups may be equalized by correcting the command value so as to balance the positive DC current when the positive switch is changed over and by correcting command value so as to balance the negative DC current when the negative switch is changed over.

Furthermore, in order to achieve the object according to the present invention, a control device for the self exciting current source power converted, comprising a plurality of of self-turn-off devices connected in a bridge and a power converter which convert DC to AC and an inverter which converts DC to AC, wherein the DC side of the converter and the DC side of the inverter are connected; the before-mentioned converter performs the constant current control by means of a current control circuit; and the before-mentioned inverter performs the power control by means of power control circuit, and wherein a DC power correction circuit is provided for correcting the magnitude of DC, that is, the output of the before-mentioned converter, larger or smaller according to the magnitude of the AC power, that is, the output of the before-mentioned inverter.

According to the present invention, the DC current is small when the power is small and DC current is large when the power is large as the magnitude of the DC current is corrected in accordance with the magnitude of the output of the inverter and thus the inverter may be operated always under the condition that higher harmonics are less and furthermore an operation in the range of small power is also possible.

Furthermore, in order to achieve the before-mentioned object according to the present invention, a control device for a self-exciting current source power converter, comprising a multiple of the self-turn-off devices connected to a bridge and a plurality of the unit converters, which convert DC power to AC power and by which AC current is supplied to an AC current system, wherein the control device comprising a normal operation decision means, which decides a normal operation condition of the before-mentioned power converters basing upon the change rate in a prescribed time, while the output current from the before-mentioned power converter and so on are inputted; a DC current command generating means, which generates DC current commands according to the decision by means of this normal operation decision means; a DC current control means, which generates an active portion current command according to the deviation between the DC current commands from the before-mentioned DC current command generating means and the DC current from the before-mentioned power converter; a reactive power control means, which generates a reactive portion current commands according to the deviation between the reactive power commands and the reactive power of the before-mentioned power converter; a system voltage detecting means, which detects the system voltage impressed to the before-mentioned AC system; a computing means, which computes the command vectors of the current, which the before-mentioned converter should output, according to the output signals of the before-mentioned current control means, a reactive portion current commands from the before-mentioned reactive power control and the before-mentioned system voltage; a means which outputs the actual value vector of the current which the before-mentioned power converter may generate; and a computing means which computes the ON-OFF commands for the self-turn-off devices according to the before-mentioned selected actual vectors; whereas the before-mentioned current source power generator is controlled so as to perform one pulse actuation steadily.

BRIEF DESCRIPTION OF THE DRAWINGS

A more complete appreciation of the present inventions and many of the attendant advantages thereof will be readily obtained as the same becomes better understood by reference to the following detailed description when considered in connection with the accompanying drawings, wherein:

FIGS. 5(a)–5(d) are drawings for explaining the effectiveness of the embodiment according to FIG. 4;

FIGS. 6(a)–6(d) are drawings for explaining the problem of the control device for a self-exciting current source electric power converter of the prior art, which is similar to the embodiment of the present invention shown in FIG. 4;

DETAILED DESCRIPTION OF THE PREFERRED EMBODIMENTS

Figure 1:
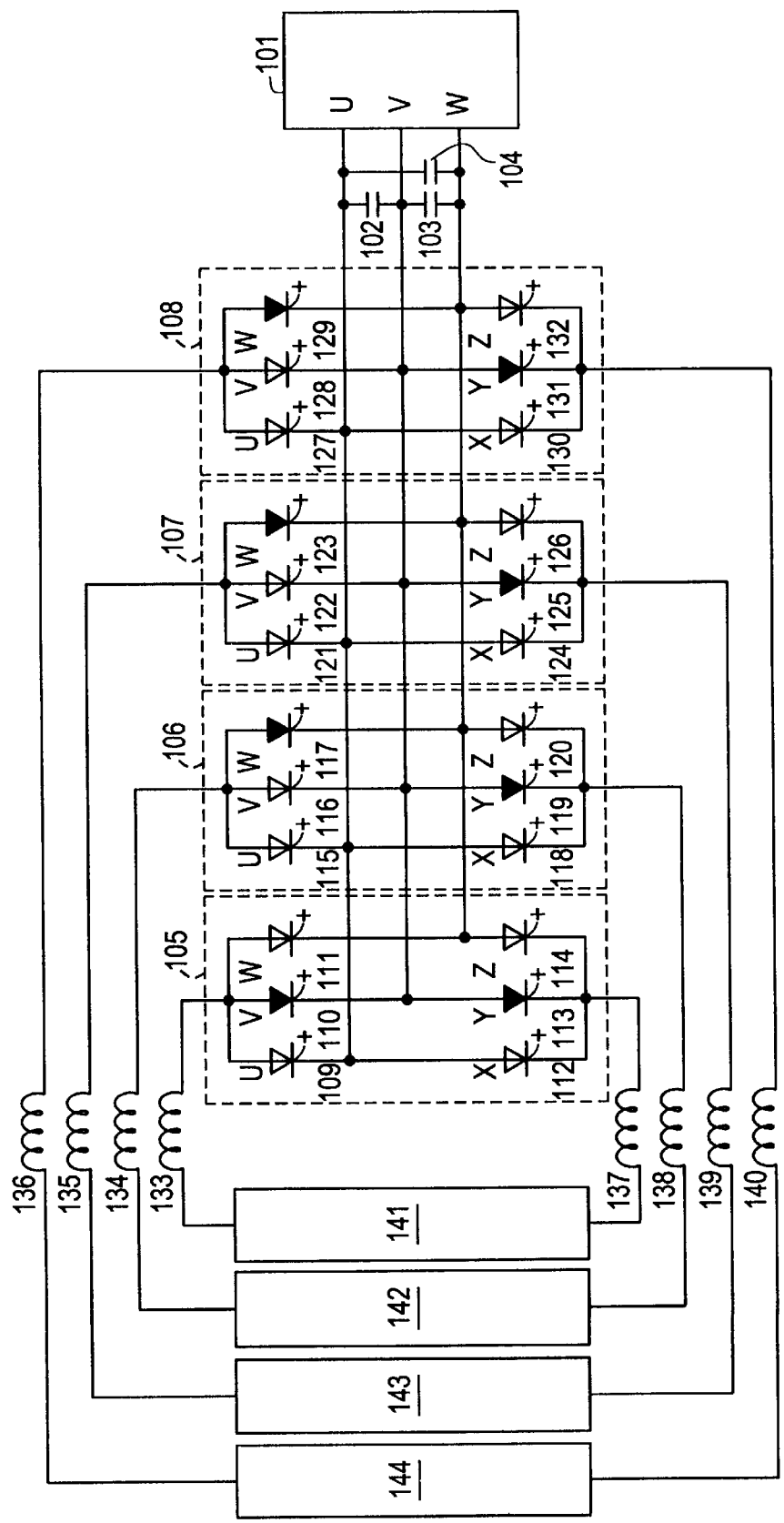
FIG. 1 is a main circuit diagram, which shows an example of a self-exciting current source electric power converter of the prior art.
Figure 2:
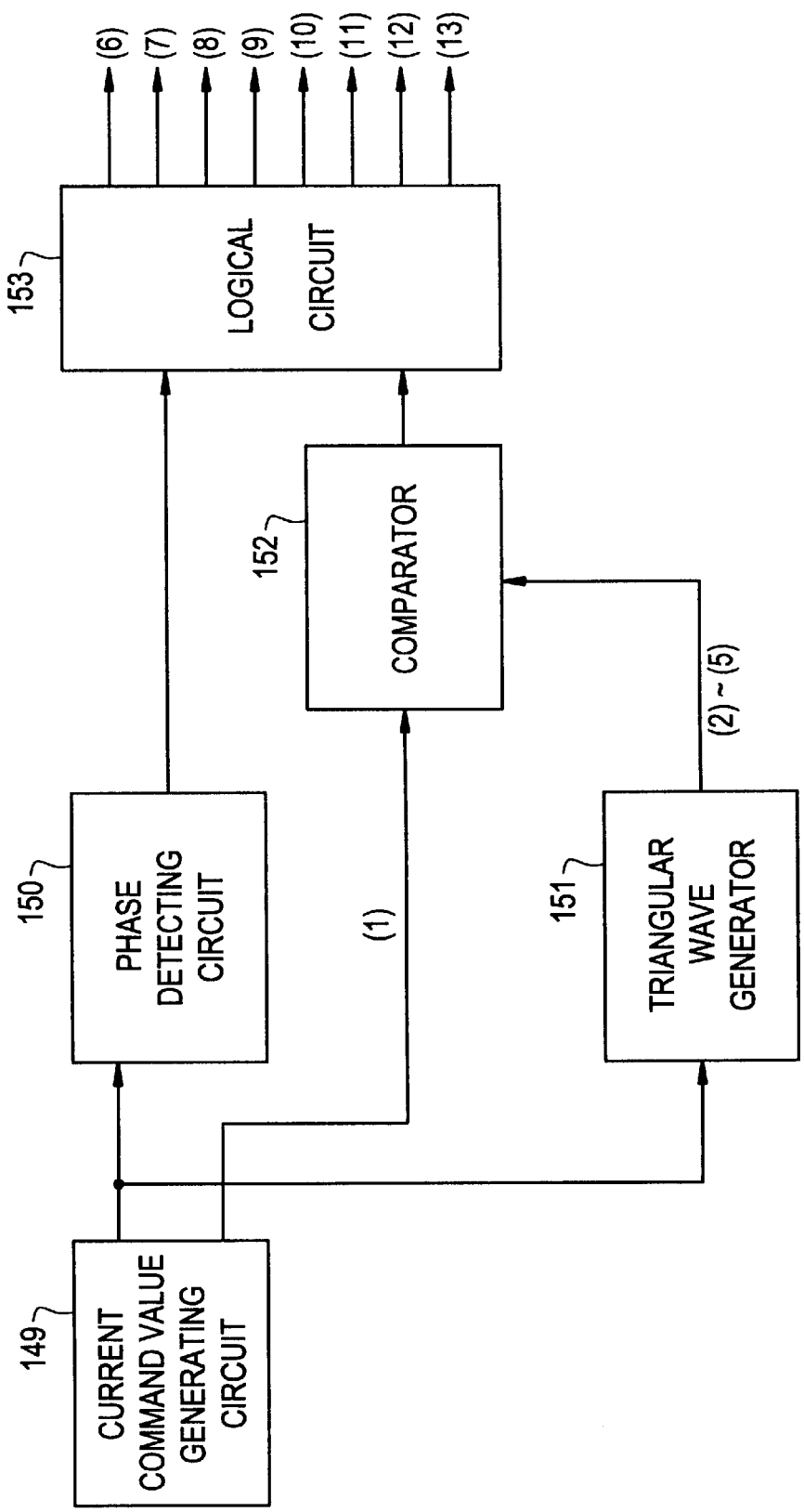
FIG. 2 is a block diagram, which shows a control device for a self-exciting current source electric power converter of the prior art in FIG. 1.
Figure 3:
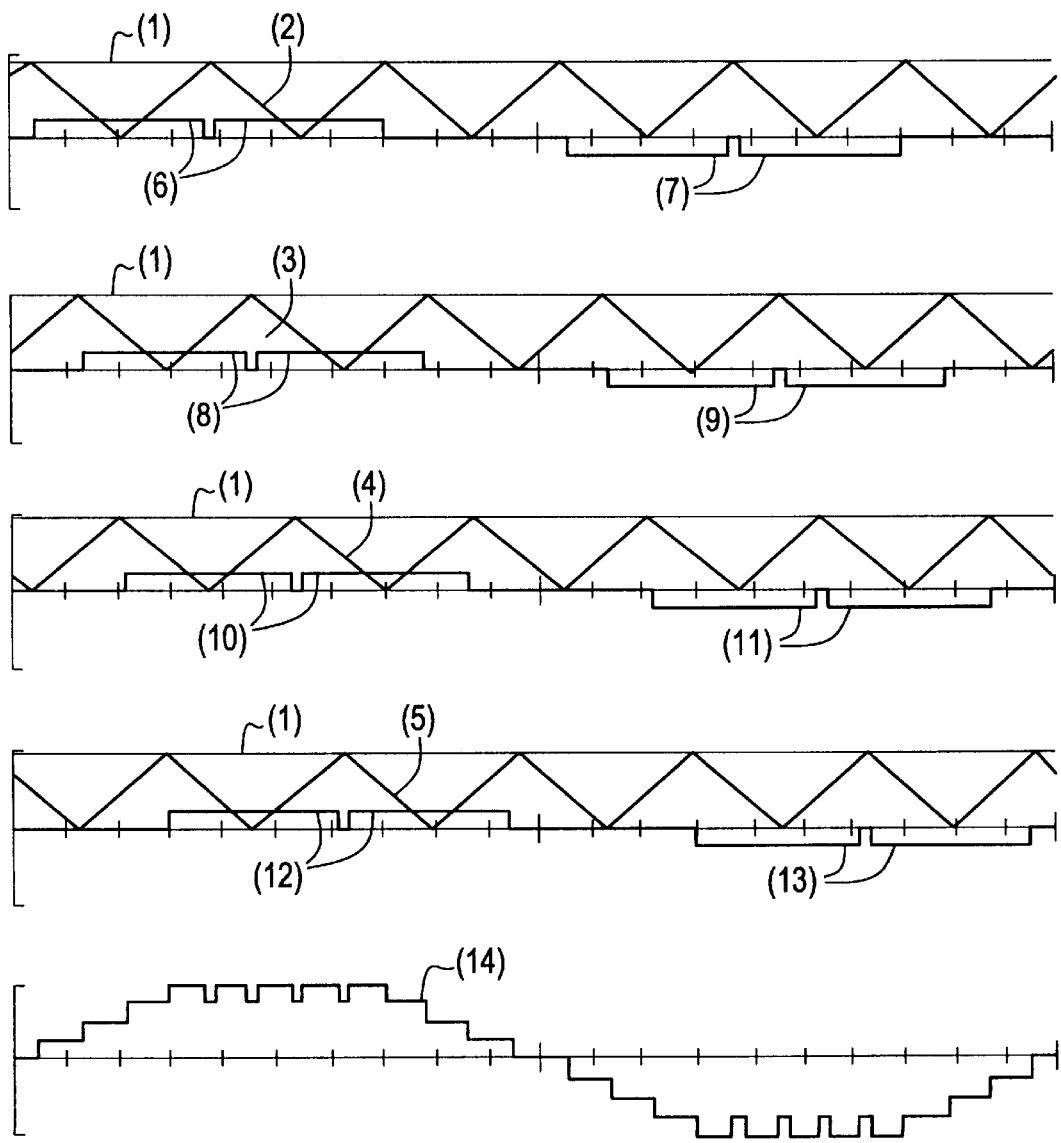
FIG. 3 is a wave-form diagram for explaining a control device for a self-exciting current source electric power converter of the prior art.

Referring now to the drawings, wherein like reference numerals designate identical or corresponding parts throughout the several views, and more particularly to FIG. 4 thereof, one embodiment of the present invention will be described.

(First Embodiment)

Figure 4:
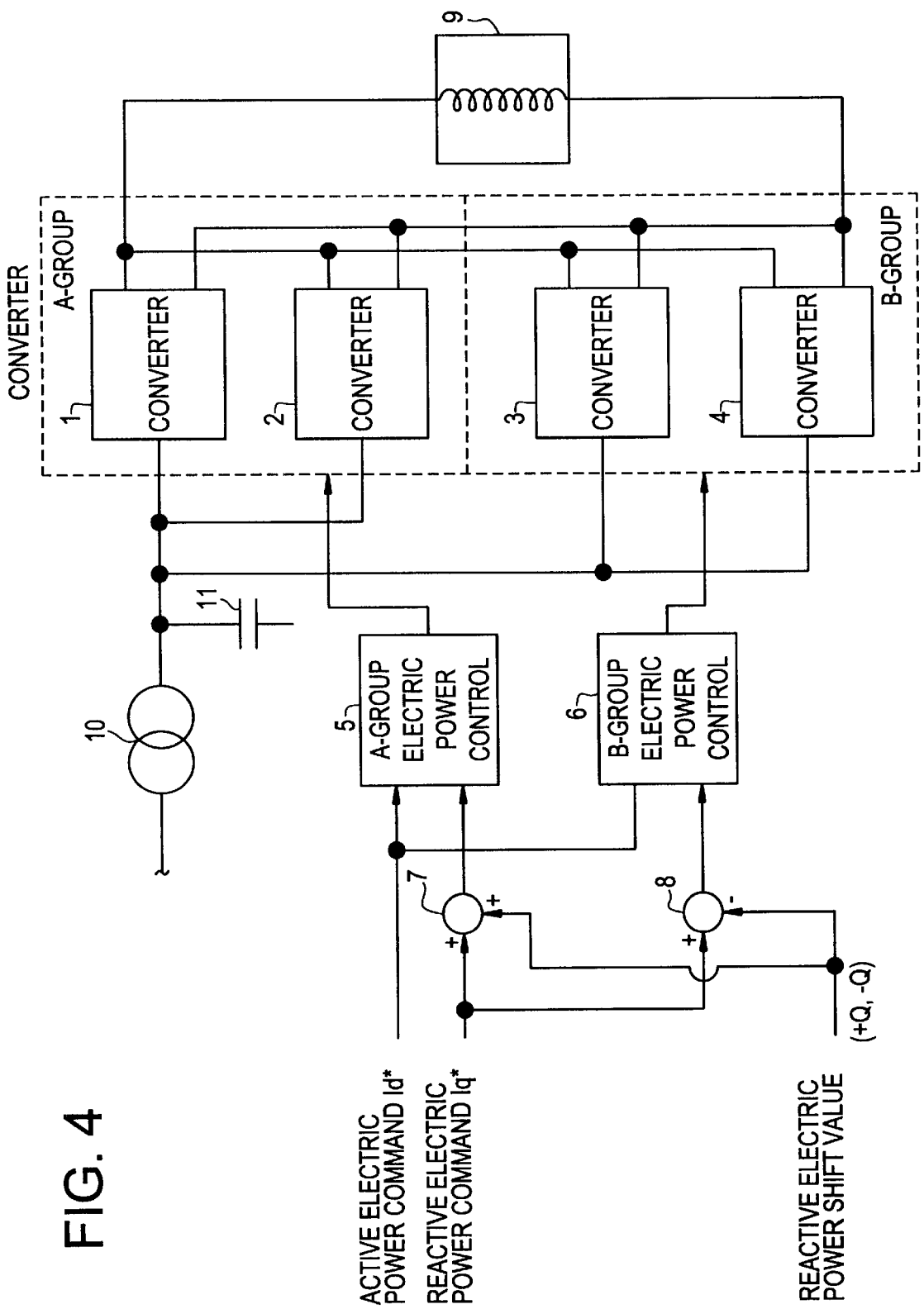
FIG. 4 is a block diagram, which shows a first embodiment of the control device for a self-exciting current source electric power converter of the present invention.

FIG. 4 is a block-diagram, which shows a first embodiment of the present invention and shows that in the control device for the self-exciting current souse power converter of the prior art, a setting means (not shown in the drawing) is provided in order to be able to specify arbitrary reactive power system command values (+Q), (−Q), additionally to the input of the power control circuit of the respective groups.

Specifically, a control devices for n-sets (n=a multiple of 2 and 4 in this case) of current source power converters comprising a plurality of self-turn-off devices, which convert AC into DC or convert DC into AC, and are connected to a bridge; (for example converter 1, 2, 3 and 4), wherein these converters are divided into two groups, A-group and B-Group; power control circuits for the respective groups, which control AC current on the input-side of the converters 1–4, are provided as a power control circuit for A-Group 5 and a power control circuit for B-Group 6; an active power command value Id* and a reactive power command value Iq* for all the converters 1–4 are inputted into the input-side of the respective power control circuits 5, 6 and at the same time, a positive arbitrary reactive power shift value (+Q) is added to one of the reactive power command value Iq* by an adder 7. Also a negative arbitrary reactive power shift value (−Q) is added to the other reactive power command value Iq* by an adder 8; and the both reactive power shift values +Q, −Q are offset each other.

Meantime, a DC load 9 is connected to the output-side of the converters 1–4, and a transformer 10 and a capacitor 11 are connected to the output-side of the converters 1–4. Meantime, converters are divided into two groups in the above embodiment, however, the converters may be also divided into 4 groups and so on.

Following effectiveness may be obtained by the control device for the self-exciting current source power converters according to the first embodiment of the present invention as constituted in the above, Namely, when a reactive power shift value (+Q) is given to the input-side and a A-Group power control circuit 5 and a reactive power shift value (+Q) is given to the input-side and a B-Group power control circuit 6, the output current from A-group power control circuit 5 forms the wave as shown in FIG. 5(a) and the output current from the B-group power control circuit 6 forms the wave as show in FIG. 5(b) and, therefore, the total current from the power control circuits 5, 6 forms a wave shown in FIG. 5(c) and thus a pulse which is shorter than the minimum ON-time of self-turn-off devicesuch as GTO, may be outputted. In other words, short pulses may be obtained by taking out the difference of the both outputs. As described in the above, each converter 1–4 may be operated in a mode which is not restricted by limitation such as minimum-ON-time. As shown in FIG. 5 (d) a power in the range of 0 PU (Zero-per-unit) may be outputted as a total of powers from A-group and B-group.

As the self-exciting current source power converters comprising self-turn-off devices such as GTO may be commutated at an any phase, the active power and the reactive power may be controlled independently each other. However, in the case of GTO for example, as the minimum ON-time has to be held, pulse shorter than the minimum ON-time may not be outputted.

FIG. 6 is a drawing for explaining the problem of the control device for a self-exciting current source electric power converter of the prior art, in which case reactive power system command values may not be inputted as shown in FIG. 4. If the width of the pulse is narrowed, the minimum ON-time in FIG. 6 (b) may no more be held and the pulse maynot be outputted as shown in FIG. 6 (c). For this reason, as shown in FIG. 6 (d), in the range in which operation is impossible, in other words, the power of 0 PU (Zero-per-unit) may not be outputted.

According to the first embodiment explained in the above, a control device for the self-exciting current souse power converter, by which a small power may be outputted in the range of 0 PU without the limitations such as minimum ON-time, may be obtained.

(Second Embodiment)

Figure 7:
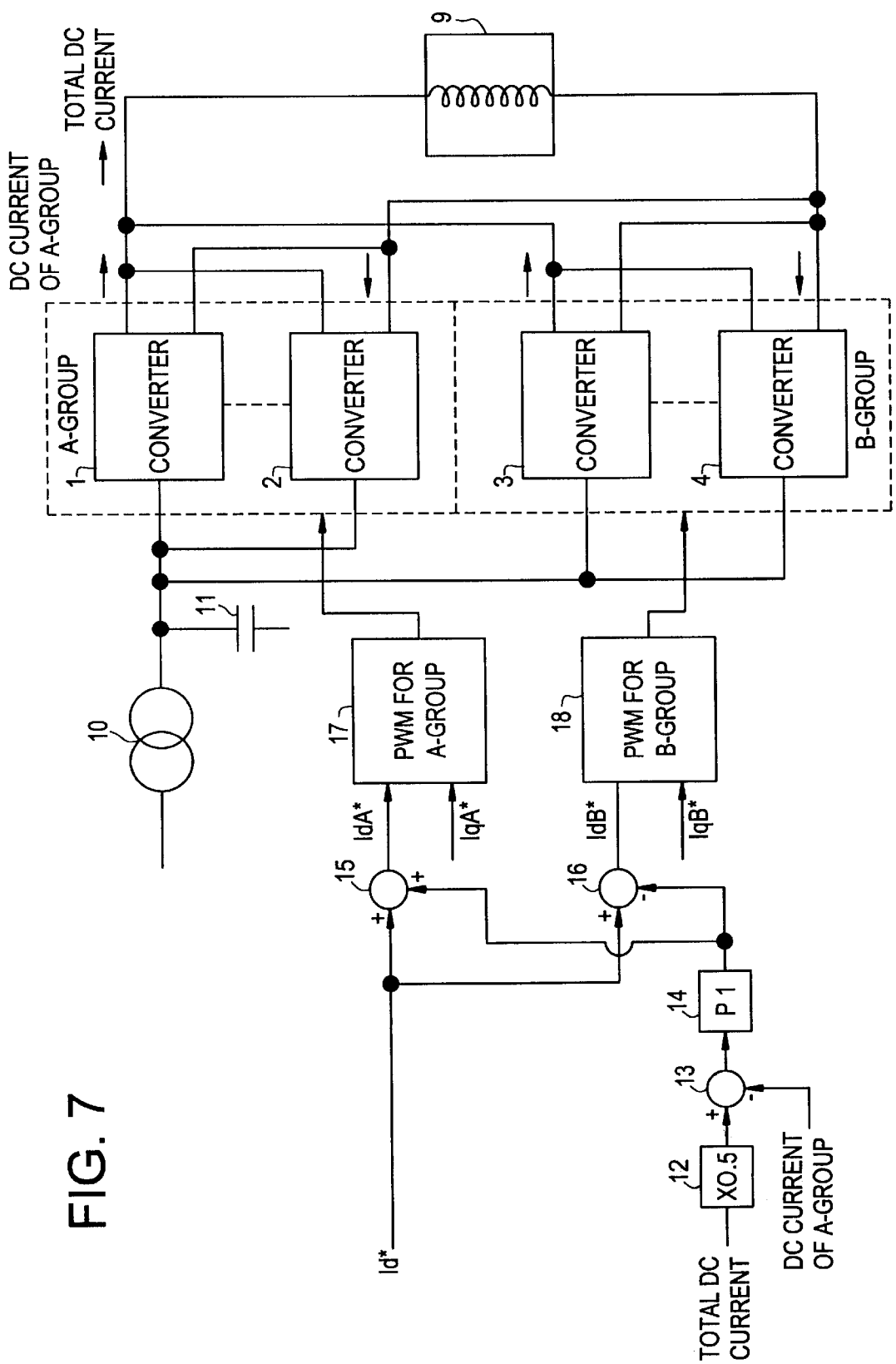
FIG. 7 is a block diagram which shows a second embodiment of the control device for a self-exciting current source electric power converter of the present invention.

FIG. 7 is a block diagram which shows a second embodiment of the present invention, wherein a constant unit 12, a comparator 13, subtraction unit 15, an addition unit 16 and a proportional integrator 14 are added to the control device for a self-exciting current source electric power converter of the prior art and constituted as follows.

A control devices for n-sets (n=a multiple of 2 and 4 in this case) of current source power converters comprising a plurality of self-turn-off devices, which convert AC into DC or convert DC into AC, and are connected to a bridge, for example, comprising converters 1, 2, 3 and 4, wherein these converters are divided into two groups, A-group and B-Group; a total current value of the respective converters 1–4 is detected by a current detector which is not shown in the drawing; one half of the total DC current value is assumed as a DC current command value; a DC current value of A-group converters 1, 2 among the converters 1–4 is detected; the DC current command value and the detected DC current value are compared each other at the comparator 13; a correction value is computed by proportionally integrating the current deviation by a proportional integrator 14; the correction value is subtracted from the total active current command value Id* (a total active power command value of the converters 1–4); and the correction value is added to the active power command value Id*; the subtracted value and the added value are inputted into B-group PWM 18 and A-group PWM 17 respectively; a gate signal for B-group converters is generated at B-group PWM 18 according to the current command value IdB*and IqB* for B-group converters and a gate signal for A-group converters is generated at A-group PWM 17 according to the current command value IdA* and IqA* for A-group converters.

By the second embodiment as described in the above, the following effectiveness may be obtained. Namely, DC current command is obtained by multiplying the detected total DC current by 0.5; A-group DC current is detected; a correction value is obtained by proportionally integrating the difference between the DC current command and the said DC current; the correction value is added to the total active current command value Id*; and the said correction value is subtracted from the total active power command Id*. Thus, the DC current as the output current form A and B groups may be equalized. The reason, why the gain is specified as 0.5 is that the system is divided into two groups, A and B-groups.

(Third Embodiment)

Figure 8:
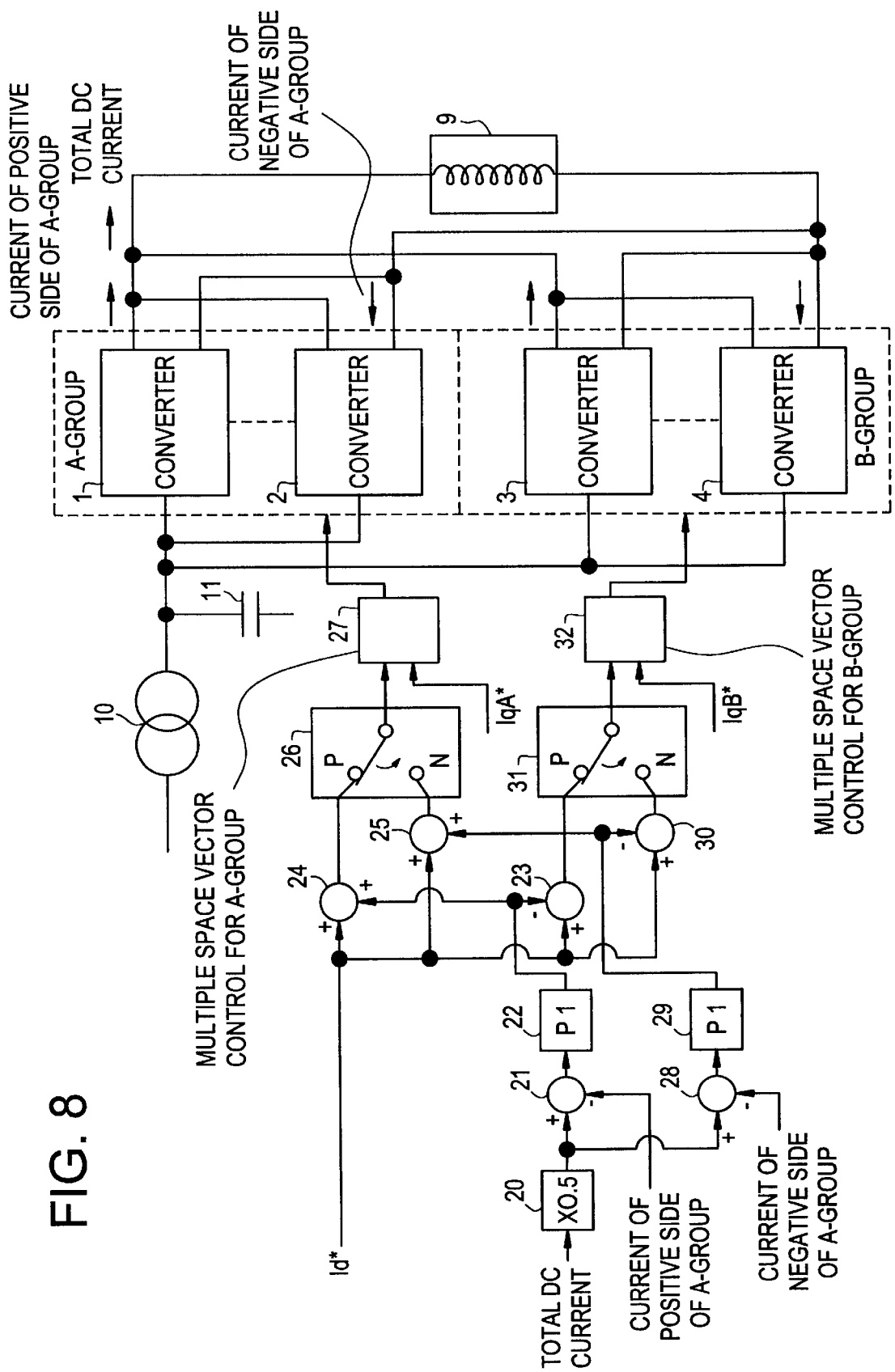
FIG. 8 is a block diagram which shows a third embodiment of the control device for a self-exciting current source electric power converter of the present invention.

FIG. 8 is a block diagram for explaining a third embodiment of the present invention. At the control device for the self-exciting current source power converters combined with a multiple space vector control, which will be described hereinafter, and a small power range control (a control system, wherein, a plurality of power converters are divided into two groups and the output is balanced by offsetting the outputs from the two groups by using positive and negative arbitrary reactive currents (+Q, –Q)), wherein the following constitution is provided for preventing any unbalance caused between the current from the two groups.

The total DC current value of the respective power converters, for example, the converter 1–4, is detected by a current detector, which is not shown in the drawing; a DC current command value is obtained by multplying the total DC current value by ½ by means of constant device 20; a positive DC current (P current of A-group) from the converters 1, 2 of A-group and a negative DC current (N current of A-group) from the converters 1, 2 of A-group are detected respectively by the current detectors which are not shown in the drawing, while the converters 1, 2, 3 and 4 are divided into two groups. A-group and B-group; the before-mentioned DC current command value and a positive DC current value are compared each other by the comparator 21; the before-mentioned DC current command value and a negative DC current value are compared by the comparator 28, and the positive and negative current correction values are computed at the proportional integrator 22, 29 by proportionally integrating the deviations obtained by comparison.

The positive current correction value computed by the proportional integrator 22 is inputted into one of the inputs of the adder 24 and subtractor 24 respectively; the before-mentioned active power command Id* is inputted into the other input of the adder 24 and subtractor 24 respectively; the added value at the adder 24 and the subtracted value at the subtractor 23 are inputted into the terminals of the switches 26, 31 respectively.

The positive current correction value which is computed by the proportional integrator 29 is inputted into one of the input-terminals of the adder 25 and the subtractor 30 respectively, and the before-mentioned active power command Id* is inputted into other input-terminal of the adder 25 and the subtractor 30; and the added value at the adder 25 and the subtracted value at the subtractor 30 are inputted into the terminals of the switches 26, 31 respectively.

And, the common terminal of the switches 26 is connected to one of the input-terminals of A-group multiple space vector control circuit 27, which is described hereinafter; and the command IqA* is inputted into the other terminal of A-group multiple space vector control circuit 27; and the output of A-group multiple space vector control circuit 27 is given to A-group converters 1, 2.

The common terminal of the switch 31 is connected to one of the input-terminals of B-group multiple space vector control circuit 32, which is described hereinafter; the command IqB* is inputted into the other input-terminal of B-group multiple space vector control circuit 32; and the output of B-group multiple space vector control circuit 32 is given to B-group converters 3, 4.

In this connection, A-group multiple space vector control circuit 27 and B-group multiple space vector control circuit 32 are to be explained. However, as the both circuits are of the same constitution and have the same function, only A-group multple space vector control circuit 27 will be described and the description for B-group multiple space vector control will be omitted.

Figure 9:
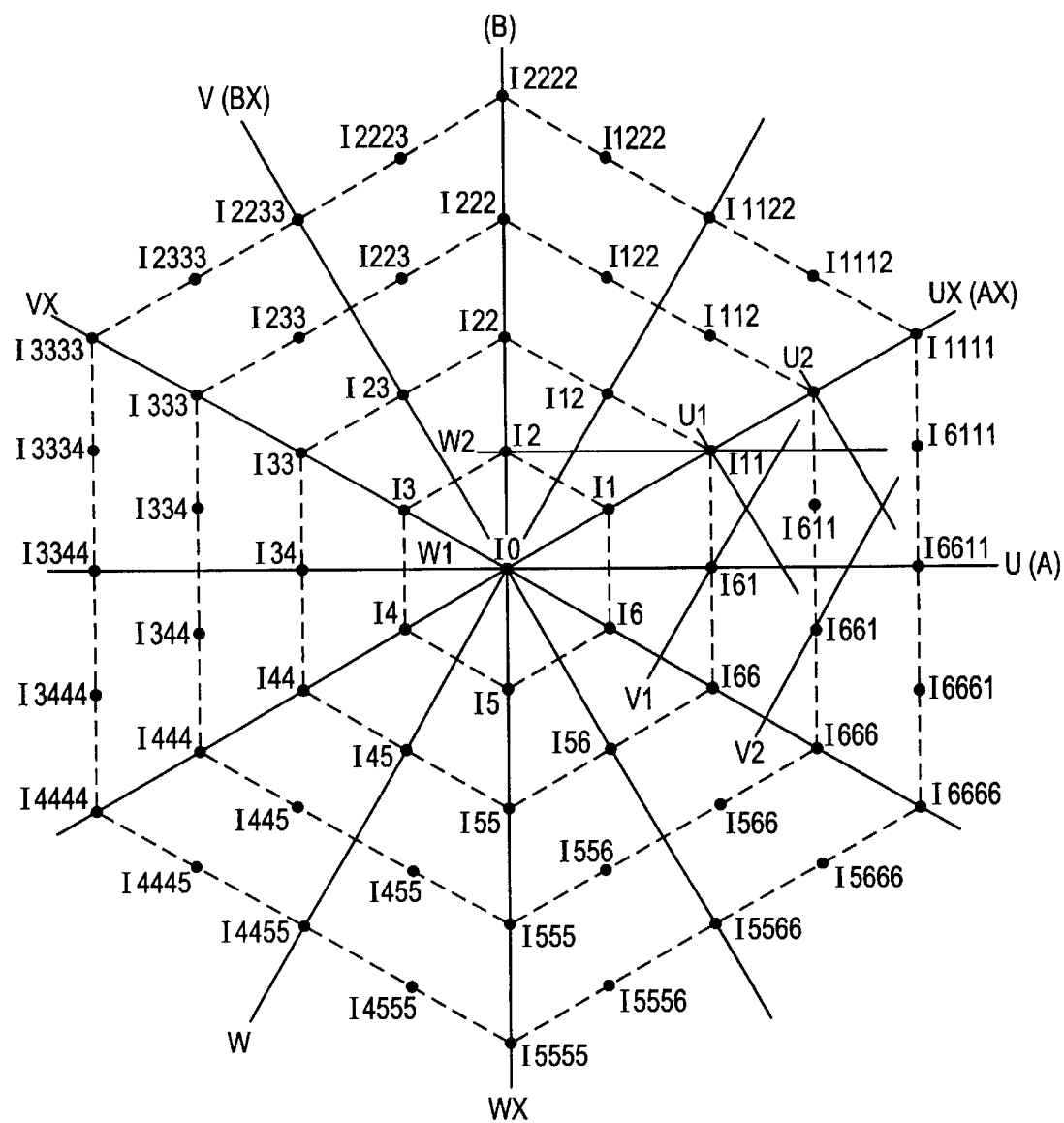
FIG. 9 is a vector diagram for explaining the multiple space vector control circuit shown in FIG. 8.

FIG. 9 is a vector diagram for explaining the wave vector which the quadruple converters 105–108 as shown in FIG. 1 may generate and its function. The axes of the coordinate are indicated as U, V and W-axis.

For example, When GTO 108 and GTO 112 of the converter 105 are applied with an electric current, the current flows from U-phase to X-phase, the output current is zero, which is indicated as I0. The current vector when the current flows from U-phase to Z-phase when GTO 109 and GTO 114 are applied with an electric current, is indicated as I1. The current vector when the current flows from V-phase to Z-phase when GTO 110 and GTO 114 are applied with an electric current, is indicated as I2. The current vector when the current flows from V-phase to X-phase when GTO 110 and GTO 112 are applied with an electric current, is indicated as I3. The current vector when the current flows from W-phase to X-phase when GTO 111 and GTO 112 are applied with an current, is indicated as I4. The current vector when the current flows W-phase to Y-phase when GTO 111 and GTO 113 are applied with an electric current, is indicated as I5. The current vector when the current flows from U-phase to Y-phase when GTO 109 and GTO 113 are applied with an electric current, is indicated as I6. As described in the above a converter may generate 7 kinds of current vectors.

FIG. 9 shows the all the current vectors which a quadruple converter as shown in FIG. 1 may generate, 61 kinds of current vectors may be generated by combining the current vectors from four unit converters. For example, the vector I111 shows the situation when three converters generate a current vector 1 and one converter generate a current vector 0. The vector I1112 shows the situation when three converters generate a current vector 1 and one converter generates a current vector 2. The vector I6611 shows the situation when two converters generate a current vector 6 and two converters generate a current vector 1. And so forth on.

When the command vector of the AC output current of such a current power converter is given, it is intended that the current condition of the GTO is controlled to have the converter generate a current vector nearest to the command vector. Therefore, it is necessary to detect the reion which is nearest to the respective vectors for all the current vectors, which the converter may generate.

For example, the vector I61, I661, I6611, I6111, I1111 and I11 which surround the vector I661 are considered. The inside area of the regular hexagon formed by the locus of the point which distances to I611 and I61 are equal, the locus of the point which distances to I611 and I661 are equal, the locus of the point which distances to I611 and I6611 are equal, the locus of the point which distances to I611 and I6111 are equal, the locus of the point which distances to I611 and I1111 are equal and the locus of the point which distances to I611 and I11 are equal, is the region nearest to the vector I611.

Next, when the coordinate axes UX, VX and WX which have advanced against the coordinate axes U, V and W by 30°, are considered, it may be found that the region which is the nearest to the vector I611 lies between U1 and U2 on the UX axis, between V1 and V2 on the VX axis and between W1 and W2 on WX axis. Therefore, when the command vector of the AC output current of the power converter is converted into the vectors on the axes UX, VX and WX and when the UX component of the command vector lies between U1 and U2, VX component lies between V1 and V2 and also WX component lies between W1 and W2, the converter current vector, which lies nearest to the command vector is I611.

Figure 10:
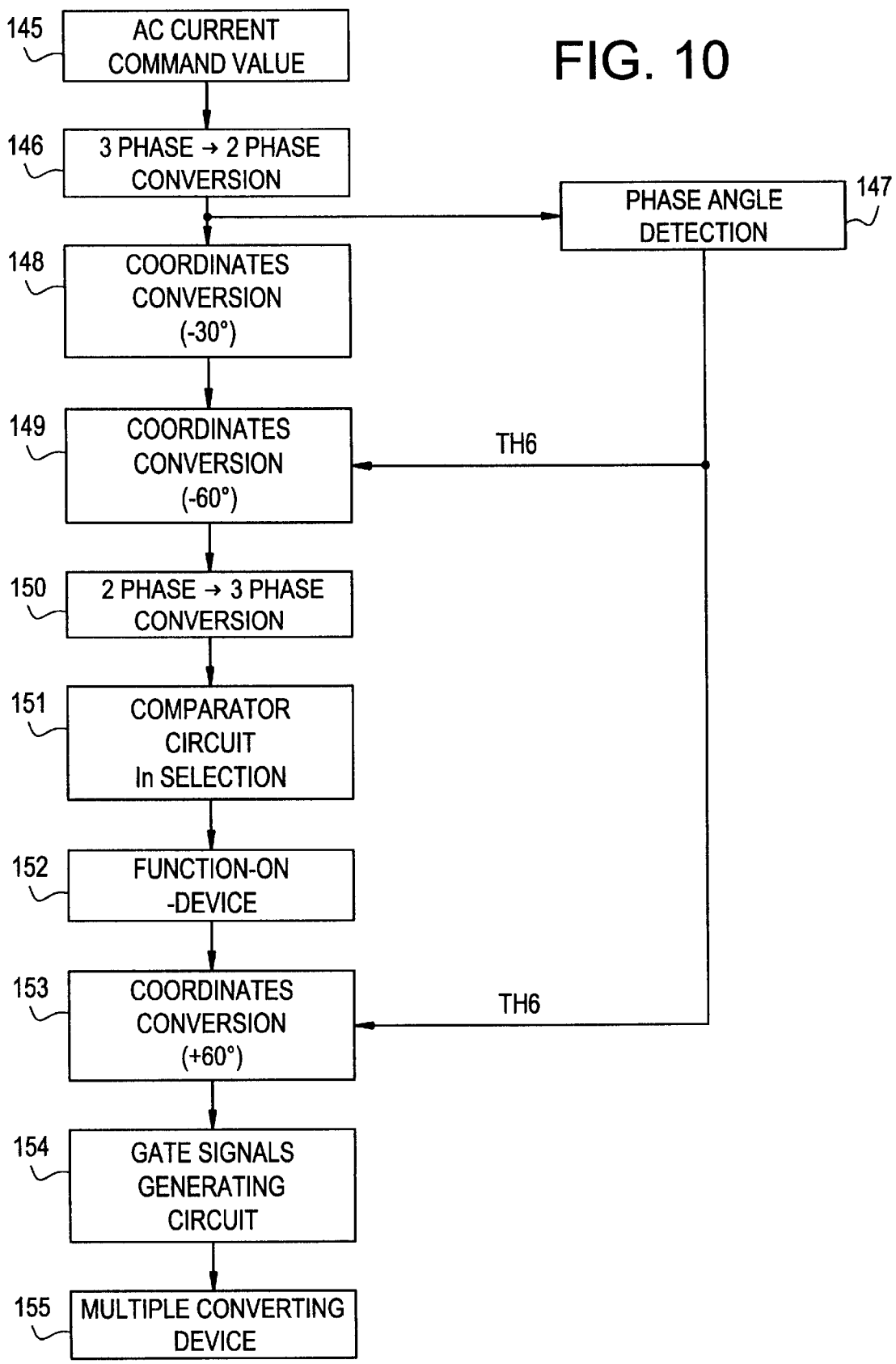
FIG. 10 is a block diagram for for explaining the multiple space vector control circuit shown in FIG. 8.

As described in the above, the converter current vector, which lies nearest to the command vector may be selected by means of UX, VX and WX components of the command vector. FIG. 10 is a block diagram showing an example of the control circuit, which controls the converter current vector according to the before-mentioned principle.

In FIG. 10, reference 145 indicates a AC current command value generating circuit, which gives the converter output current command value vector as the components R1U1, R1V1 and R1W1 on the axes U, V and W. Reference 146 is a 3-phase→2-phase converter comprising an adder and a subtractor, wherein the components R1U1, R1V1 and R1W1 on the axes U, V and W, are converted into the component R1A1 and R1B1 on the axes A and B by means of the operation:

R1A1=R1U1−(R1V1+R1W1)/2

R1B1=(R1V1−R1W1)*1.732/2

However, A-axis is a parallel axis to U-axis, and B-axis is an axis which has advanced against A-axis by 90°.

Reference 147 indicates a phase detecting circuit comprising sine function, wherein the phase angle of the command value vector is detected by the operation of ATAN (R1B1/R1A1) and the command vector generates the signals in FIG. 9 which are specified as follows:

when the command vector lies between U and −W axes, TH6=0° when the command vector lies between −W and V axes, TH6=60° when the command vector lies between V and −U axes, TH6=120° when the command vector lies between −U and W axes, TH6=180° when the command vector lies between W and −V axes, TH6=240° when the command vector lies between −V and U axes, TH6=300° where as reference 148 indicates a coordinate converter comprising sine functions and by the operations of R1A2=R1A1* COS (−30°)−R1B1* SIN (−30°) and R1B2=R1B1* COS (−30°)−R1A1* SIN (−30°), the components R1A1 and R1B1 on A and B axes may be converted into the components of R1A2 and R1B2 on AX and BX axes, which is advanced against A and B axes by 30°.

Reference 149 indicates a coordinates comprising sine-functions.

Through the operations of

R1A3=R1A2* COS (−TH6)−R1B2* SIN (−TH6) and R1B3= R1B2* COS (−TH6)−R1A2* SIN (−TH6)

the components R1A2 and R1B2 on the coordinates with AX and BX axes are converted by the output signal TH6 from the phase detecting circuit 147 into the components R1A3 and R1B3 on the coordinates which turns stepwise by 60° each from the basic coordinates with AX and BX axes.

Reference 150 indicates a 2-phase→3-phase converter comprising an adder and a multiplier. Through the operations of

R1U3=R1A3/1.5

R1V3=(−0.5*R1A3+0.866*R1B3)/1.5

R1W3=(−0.5*R1A3−0.866*R1B3)/1.5, the components R1A3 and R1B3 of the coordinates, which turns stepwise by 60° each from the basic AX and BX axes, are converted into the components R1U3, R1V3 and R1W3 on the coordinates which turns stepwise by 60° from the basic coordinates with UX, VX and WX axes.

Reference 151 indicates a comparison circuit including data of the converter current vector In on the coordinates with UX, VX and WX axes. The data of In comprises 13 data, by way of example, I0, I1, I61, I111, I112, I611, I1111, I1112, I6611, I6111, I1111, I1112 and I1122. The comparison circuit 151 receives the command values R1U3, R1V3 and R1W3 of the converter current vector from the 2-phase→3-phase converter 150. For example, when R1U3 lies between U1 and U2 RIV3 lies between V1 and V2 and also RIW3 lies between W1 and W2 by referring FIG. 9, a vector I611 is selected as the converter current vector, which lies nearest to the command value vector.

As described in the above, a vector In is selected as the converter current vector, which lies nearest to the command value vector. When the command vector turns and enters into the area of −W axis and V axis in FIG. 9, the signal TH6 from the phase detecting circuit changes from 0° to 60°. Therefore, as the command vector of the converter current turns by 60° by the coordinates converter 149, the vector In by means of 13 data consisting of I0, I1, I61, I111, I112, I611, I1111, I1112, I6611, I6111, I1111, I1112 and I1122 may be continuously detected. In may be detected by above-mentioned 13 data around allthe 360° by means of the same method.

Reference 152 indicates a function generator, which generates switching patterns for GTO corresponding to the vector In. For example, referring to FIG. 1, when a vector I611 is given as the vector In, the converter 105 switches ON GTO for U-phase and Y-phase, the converter 106 switches ON GTO for U-phase and Z-phase, the converter 107 switches ON GTO for U-phase and Z-phase and the converter 108 switches ON GTO for U-phase and V-phase, the converter 105 generates a current vector of 6, the converter 106 a current vector of 1, the converter 107 a current vector of 1 and the converter 108 a current vector of 0 and therefore the current vector, which is composed of these vectors, becomes I611.

Reference 153 indicates a coordinates converter. The current command value vector, which was turned to minus-direction stepwise by 60°, is returned to the original coordinates if the vector, by turning the ON-vector of GTO to plus-direction by 60° by a signal TH6 from the phase detecting circuit 147.

Figure 11:
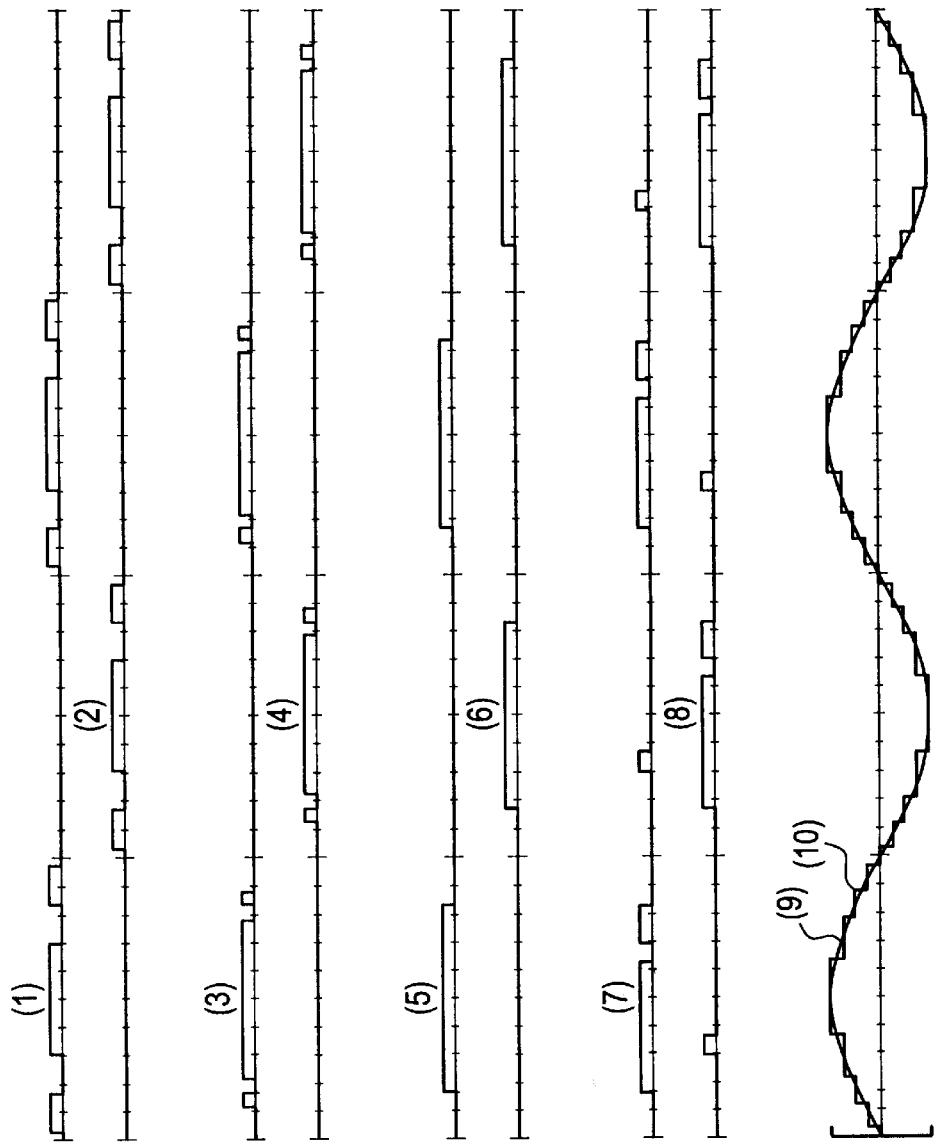
FIG. 11 is a wave-form diagram for explaining the effectiveness of the multiple space vector control circuit shown in FIG. 8.

Reference 154 indicates a signal generating circuit, which generates firing pulses of GTO of the multiple converter 155 comprising the converters 105–108 in FIG. 1. FIG. 11 shows the wave diagram indicating the action, when the power converters are operated as shown in FIG. 9 and FIG. 10. In FIG. 11, (1) indicates the current, which flows to U-phase of the GTO 109 of the converter 105 of FIG. 1; (2) indicates the current, which flows to X-phase of the GTO 112 of the converter 105; (3) indicates the current, which flows to U-phase of the GTO 115 of the converter 106; (4) indicates the current, which flows to X-phase of the GTO 118 of the converter 106; (5) indicates the current, which flows to U-phase of the GTO 121 of the converter 107; (6) indicates the current, which flows to X-phase of the GTO 124 of the converter 107; (7) indicates the current, which flows to U-phase of the GTO 127 of the converter 108; (8) indicates the current, which flows to X-phase of the GTO 130 of the converter 108; (10) indicates the U-phase current, which is the current of U-phase, which is the sum of the above currents (1)–(8). It may be seen that the right sine wave, which follows the command value (9).

The action and the constitution of the multiple space vector converting circuit for A-group are same as the action and the constitution of the multiple space vector converting circuit for B-group.

Next in the following the action and the effectiveness of FIG. 8 will be described. As the multiple space vector control circuits 27 and 32 perform the switching of 26 and 31 by 60° each. When the switches 26 and 31 are turned upwards, the command value is corrected so as to balance the DC current on the positive side and when the switches 26 and 31 are turned downwards, the command value is corrected so as to balance the DC current on the negative side and therefore the DC currents on the both sides of P and N may be balanced.

In other words, a difference between the value, which is obtained by multplying the total DC currents by ½, and the DC current on positive side, and a difference between the value, which is obtained by multiplying the total DC currents by ½, and the DC current on the negative side are proportionally integrated respectively. By inputting the correction value of the DC current on the positive side, when the switches 26 and 31 are turned upwards, and by inputting the correcting value of the DC current on the positive side, when the switches 26 and 31 are turned downwards, DC currents within the group are balanced, both on the positive and the negative sides.

As the result, according to the third embodiment, the control of a small power range is possible when a multiple space vector control circuits 27 and 32 are used. In this respect, the DC currents of the groups do not balance between P and N, when a multiple space vector control circuit and a small power range control circuit are just combined. This is due to the fact, that the current from P does not return to N in the respective groups. This is called cross current.

(Fourth Embodiment)

Figure 12:
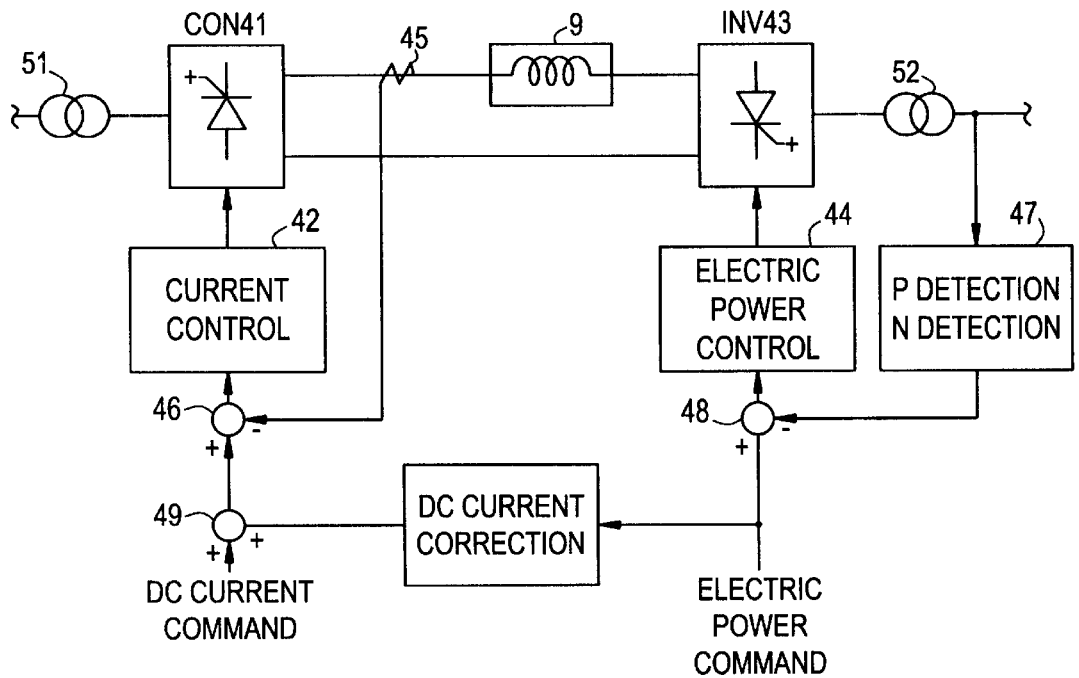
FIG. 12 is a block diagram which shows a fourth embodiment of the control device for a self-exciting current source power converter of the present invention.

FIG. 12 is a block diagram for explaining the fourth embodiment of the present invention, and in which a control device for the electric power converter is added newly by a DC current correcting circuit 50. In other words, the control device is the control device for a self-exciting current source power converter, comprising a plurality of self-turn-off devices connected in a bridge, and a converter 41, which converts AC power into DC power and an inverter 43, which converts DC power into AC power, wherein the DC side of the converter and the DC side of the inverter are connected each other, the before-mentioned converter 41 performs a constant DC current control by means of the current control circuit 42, and the before-mentioned inverter 43 performs a power control by means of power control circuit 44.

A subtractor 48 is provided in the input of the electric power control circuit 44. The electric power, an active power or reactive power from the output of the inverter 43, which is detected by the detecting circuit 47, is inputted into the one of input terminals and the electric power command is inputted into the other terminal of the subtractor 48. And the deviation of the both currents is inputted into the power control device 44.

The power command, which is inputted into the other one of the input terminals of the subtractor 48, is inputted into the DC current correcting circuit 50, the correcting command with a certain gain is given to the one of input terminals of the adder 49 and a DC current command is given to the other input terminals of the adder 49. The output of the adder 49, which is a output of the DC current correcting circuit 50, and the adding value of the DC current command are inputted into one of the input terminals. The electric current detected value from the DC current detector 45, which detects the output DC current from the converter 41, is inputted into the other terminal of the subtractor 46. The value, which is obtained by subtraction or addition of the both values is inputted into the electric current controlling circuit 42. Meantime, reference 51 and 52 indicate the transformer respectively.

According to the fourth embodiment as constituted in the above, as a DC current corresponding circuit 50 is provided, the DC current, which is an output of the converter 41, is corrected to larger or smaller according to the magnitude of AC current, which is the output of the inverter 43. Specifically, when the AC power is small, which is the output of the inverter 43, the DC current becomes larger and thus the converter 41 and the inverter 43 may be operated always under the operation condition, that harmonics are less.

Figure 13A:
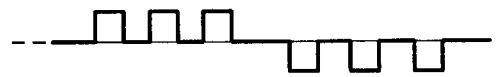
FIGS. 13(a) and 13(b) are wave form diagrams for explaining the effectiveness of the multiple space vector control circuit shown in FIG. 12.
Figure 13B:
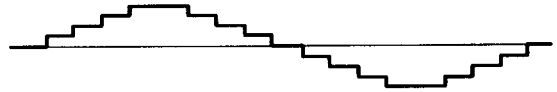

FIG. 13 is the drawing for explaining the above operating condition. FIG. 13 (a) shows the output current from the inverter 43, when the output signals are not generated by the DC current correcting circuit 50. In this case, the DC current stays large. FIG. 13 (b) shows the output current from the inverter 43, when the output signals are generated by the DC current becomes small.

As the result, a current with less harmonics may be outputted, even when the output of the inverter is small.

Figure 14:
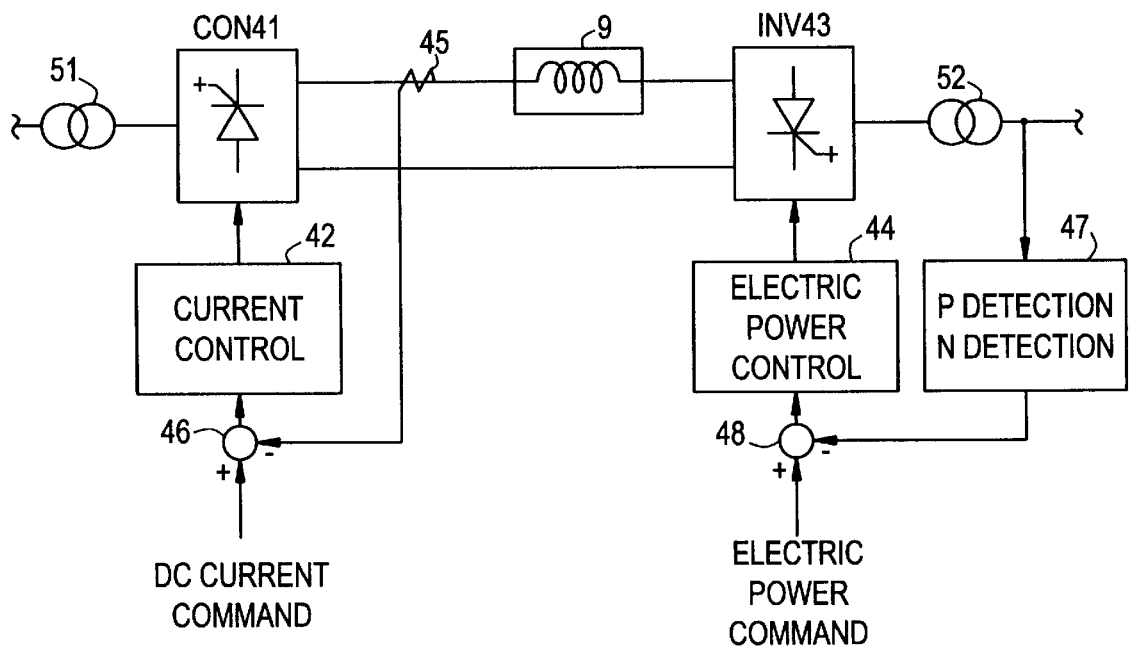
FIG. 14 is a block diagram showing the control device of the prior art similar to the embodiment of the control device for the self-exciting current source power converter of the present invention in FIG. 12.
Figure 15A:
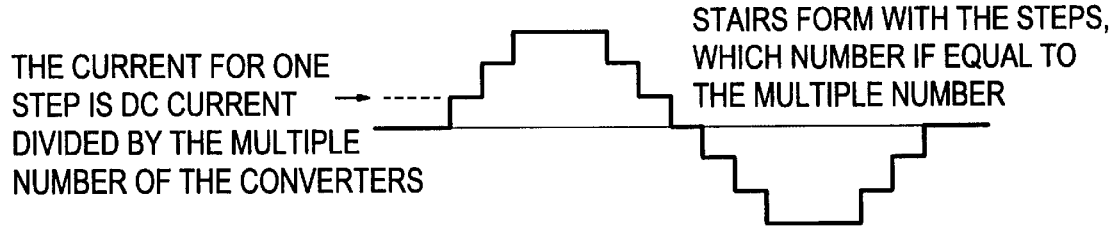
FIGS. 15(a) and 15(b) are drawings for explaining the problem of the control device of the prior art shown in FIG. 14.
Figure 15B:
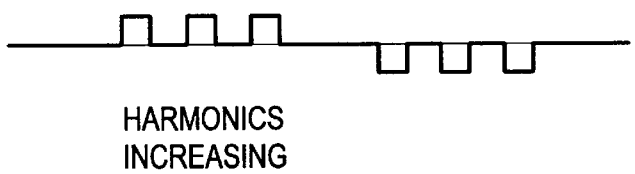

In this respect, the control device for this kind of the power converter devices of the prior art has the following problems. FIG. 14 shows the case of the prior art, in which the DC current correcting circuit 50 of FIG. 12 is not provided. FIG. 15 shows the wave form of the output electric current from the inverter 43. In the example of FIG. 14, the converter 41 performs a constant DC current control by means of the current control circuit 42 and the inverter performs the power control by means of the power control circuit 44.

FIG. 15 (a) shows the output current of the inverter 43 at the time of a large power output. The wave form in this case is like stairs comprising multiple steps. The current corresponding to a step is the DC current divided by the multiple number of the converters.

FIG. 15 (b) shows the output current of the inverter 43 at the time of a small power output and in this case harmonics are increasing. In case of the power converter of the prior art, there is a problem that the harmonics of the output current increase, when the power on the side of the inverter 43 is reduced to the range of 0 PU.

(Variation)

Figure 16A:
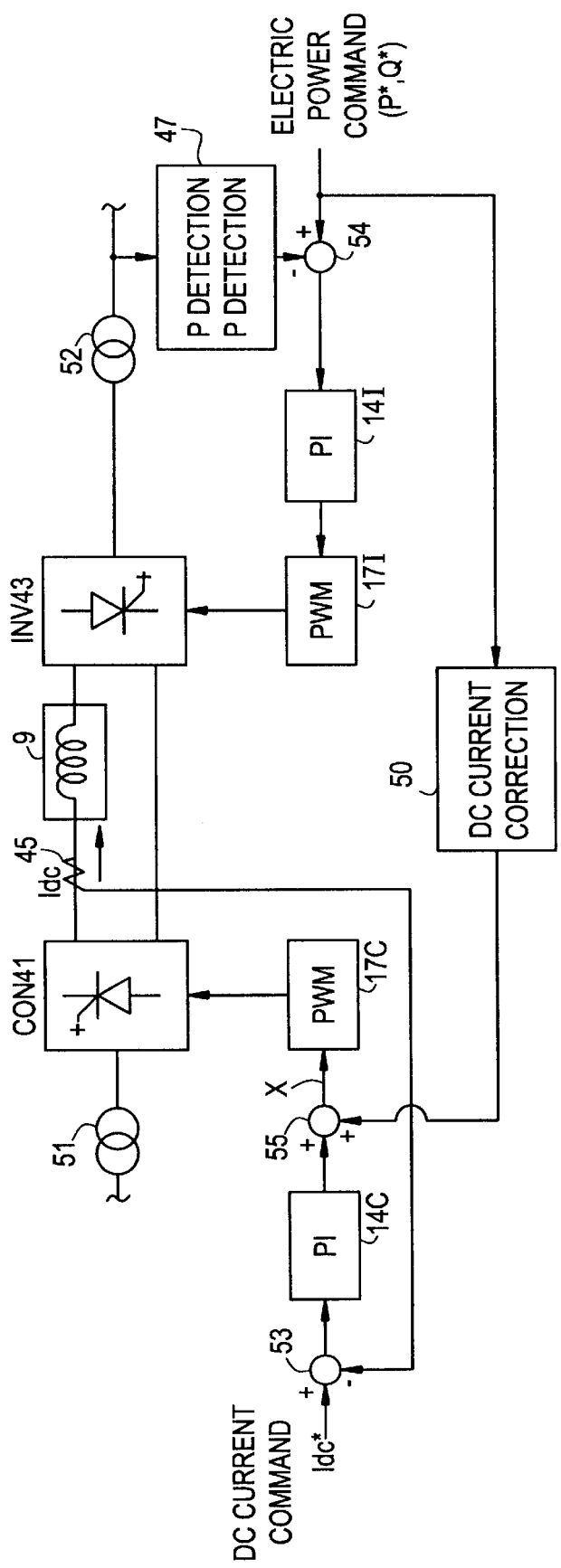
FIGS. 16(a) and 16(b) are drawings for explaining a variation of the embodiment of the present invention shown in FIG. 12.
Figure 16B:
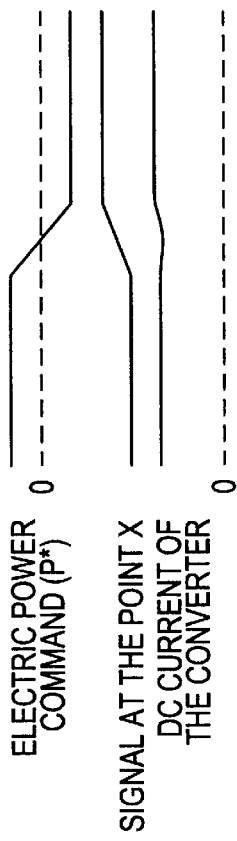

FIG. 16 shows a variation of the fourth embodiment in FIG. 12, the drawing (a) shows the block diagram of the constitution and (b) shows the wave form for explaining the effectiveness of the constitution (a).

By means of the detecting circuit 47 detecting the active power and the reactive power on the secondary side of the transformer 52 which are provided on the output side of the inverter 43, the detected value of the power is inputted into the minus input terminal of the subtractor; the power command is inputted into the plus input terminal of the subtractor 54; the deviation of the both values is inputted into the pulse-wide modulation circuit 17I through the proportional integrating device 14I; and the pulse signals obtained by the pulse-width modulation circuit 17I are inputted into the gate terminal of the switching device.

The DC current on the output side of the converter 41 is detected by a DC current detector 45; the detected current is inputted into the minus terminal of the subtractor 53; the DC current command is inputted into the plus terminal of the subtractor 53; the deviation of the both values is inputted into one of the plus terminals of the adder 55 through the proportional integrating device 14C; and the output of the DC current correcting circuit 50 is given to the other input terminal of the adder 55. The DC current correcting circuit 50 is inputted with the power command and outputs DC current correcting signal, which is obtained by multplying the power command value by a minus gain so as to offset this power command. The output of the adder 55 is inputted into the gate terminal of the switching device forming the converter 41 through the pulse-wide modulating circuit 17C.

According to the variation of the fourth embodiment constituted as described in the above, the power command in the form of a wave shown in FIG. 16 (b) is inputted into the DC current correcting circuit 50. In this case, if the power command drops rapidly as shown in FIG. 16 (b), the dropped value at the DC current correcting circuit 50 is multiplied by a minus gain and the multiplied value is inputted into one of the input terminals of the adder 55. The deviation of the detected DC current, which is the output of the converter 41, is proportionally integrated by the proportional integrating device 14C and the proportionally integrated value is inputted into the other input terminal of the adder 55. As explained in the above, as the output of the proportional integrating device 14C and the output of the DC current correcting circuit 50 are added, the signal at the point X in FIG. 16 (a) has a wave form, which is almost same to the wave form of before-mentioned power command, nevertheless, in a rising direction adversely to the power command. The signal at the point X is inputted into the pulse-width modulating circuit 17C and here the signal is given to the gate comprising the switching device forming the converter 41 in the direction to rise the DC current. As the result, as shown in FIG. 16 (b), the DC current on the output side of the converter 41 becomes almost constant without dropping. Thereafter, the DC current from the converter 41 is fine modulated by the proportional integrating device 14C so that the current becomes same as the DC current command.

Figure 17A:
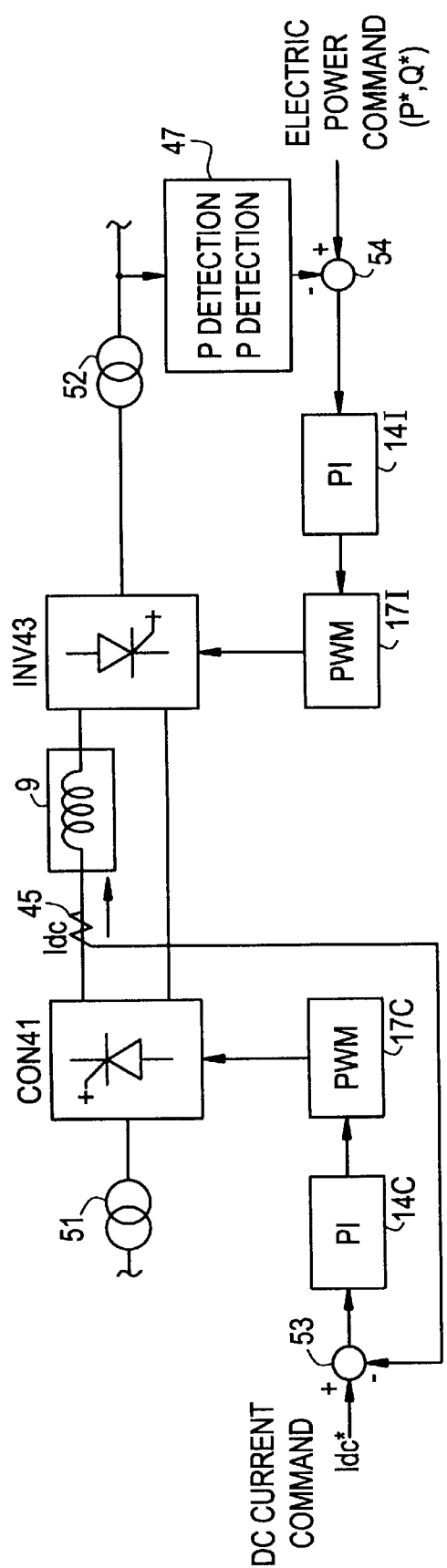
FIGS. 17(a) and 17(b) are drawings for explaining the effectiveness of the control device shown in FIG. 16.
Figure 17B:

FIG. 17 is the drawing for explaining the problem in the case of the prior art corresponding to FIG. 16 (a). FIG. 17 (a) is a block schematic diagram showing the constitution and FIG. 17 (b) is the drawing showing the wave form for explaining the problem. FIG. 17 (a) is the constitution, in which the DC current correcting circuit 50 and the adder 55 of FIG. 16 (a) are not provided. In this constitution there is a following problem. In the constitution of FIG. 17 (a), normally on the side of the converter 41, the deviation between the DC current, which is detected by the DC current detector 45, and the DC current command, is given to the pulse-width modulation circuit 17C through the proportional integrating device 14C and the DC current is regulated in this way so that the current becomes constant.

However, if the power command on the side of the inverter 43 changes, for example, drops rapidly as in the case of 17 (b), it is equivalent to the phenomenon that the load for the converter 41 changes rapidly. For this reason, DC current changes like AC current as shown in FIG. 17 (b). Thereafter the DC current is returned to the DC current command value by the proportional integrating device 14C. If the width of the deviation of the DC current becomes larger than the rated current, the capacity of the power converter has to be made larger; and on the other hand, if the width of the deviation of the DC current becomes smaller than the rated current, the aimed current may not be supplied to the load.

For this reason, it has been desirous to develop a control device for the self-exciting current source electric power converter, in which the width of the fluctuation of the DC current of the prior art may be reduced as small as possible and the solution of FIG. 16 (a) may satisfy the said desire, as described in the above.

According to the present invention as described in the above, a control device for a self-exciting current source electric power converter, in which the higher harmonics of the output current do not increase even at the small power output, and the small power may be outputted in the range of 0 PU, may be provided.

Obviously, numerous additional modifications and variations of the present invention are possible in light of the above teachings. It is therefore to be understood that within the scope of the appended claims, the present invention may be practiced otherwise than as specially described herein.

What is claimed as new and desired to be secured by Letters Patent of the United States is:

1. A control device for a self-exciting current source electric power converter, comprising:

n sets (n=a multiple of 2) of current source electric power converter having a plurality of self-turn-off devices connected in a bridge, converting AC into DC or converting DC into AC, said n sets of current source electric power converter being divided into two groups;

an electric power controlling ciircuit for controlling AC current of each said converter, said electric power controlling circuit being provided for each group; and a command means for supplying an active electric power command and reactive electric power command value of all said electric power converter to an input side of said electric power controlling circuit respectively, at same time a positive arbitrary reactive power shift value (+Q) being added to one of said electric command value by said command means, a negative arbitrary reactive power shift value (+Q) being outputted to the other reactive electric power command values by said means, said both reactive power shift values being offset each other.

2. A control device for a self-exciting current source electric power converter, comprising:

n sets (n=a multiple of 2) of current source electric power converter having a plurality of self-turn-off devicces connected in a bridge, converting AC into DC or converting DC into AC, said n sets of current source electric power converter being divided into two groups;

all the DC current values of said respective converters being detected;

a half of the said total DC current value being assumed as the DC current command value;

the DC current of one group of the electric power converters, which are divided into two groups, being detected, said DC current value and said DC current value of the group being compared each other;

the deviation being proportionally integrated to compute the correcting value, said correcting value being subtracted from said active power value, and also said correcting value is added to said active electric power command value; and gate signals for the respective groups of said electric power converters being obtained by performing a pulse width control basing upon said subtracted value and said added value.

3. A control device for a self-exciting current source electric power converter, comprising:

a plurality of the self-turn-off devices connected in a bridge, and n-sets (n=a multiple of 2) of the electric source electric power converters, which converter AC into DC, or, convert DC into AC, wherein said converters are divided into two groups; a multiple space vector control is performed by controlling positive switching devices and the negative switching devices alternately by a specific angle each in each of the groups of the electric power converters, and wherein:

all the DC current of said respective electric power converters are detected; a half of said total DC current value is assumed as a DC current command value; a positive DC current value and a minus DC current value of one of said groups of said electric power converters, which are divided into two groups, are detected; said DC current command value and said positive DC current value of the group are compared each other; and also said DC current command value and said negative DC current value of said group are compared each other; said deviations are proportionally integrated respectively to compute said positive and said negative correction values; said positive correction value is inputted into said circuit, which performs a multiple space vector control at the time of action of said positive switching device; and said negative current correcting value is inputted into the circuit which performs a multiple space vector control.

4. A control device for a self-exciting current source electric power converter, comprising:

a plurality of the self-turn-off devices connected in a bridge and a converter which converts AC into DC and an inverter which converts DC into AC, wherein the DC side of said converter and the DC side of said inverter are connected each other; said converter performs a constant DC current control by means of a current control circuit and said inverter performs an electric power control by means of electric power control circuit; and wherein:

a DC current correcting circuit is provided, which corrects the DC current, which is an output of said converter, large or small according to the magnitude of said AC electric power, which is the output of said inverter.

* * * * *